US00RE50085E

(19) United States
(12) Reissued Patent
Lee et al.

(10) Patent Number: US RE50,085 E
(45) Date of Reissued Patent: Aug. 20, 2024

(54) WASHING MACHINE AND DETERGENT CASE THEREOF

(71) Applicant: SAMSUNG ELECTRONICS CO., LTD., Suwon-si (KR)

(72) Inventors: Yong Sok Lee, Suwon-si (KR); Chang Jae Maeng, Yongin-si (KR); Jung Sang Choi, Hwaseong-si (KR); Myung Sun Kang, Suwon-si (KR)

(73) Assignee: SAMSUNG ELECTRONICS CO., LTD., Suwon-si (KR)

(21) Appl. No.: 17/562,922

(22) Filed: Dec. 27, 2021

Related U.S. Patent Documents

Reissue of:
(64) Patent No.: 9,328,450
Issued: May 3, 2016
Appl. No.: 13/137,864
Filed: Sep. 19, 2011

U.S. Applications:
(63) Continuation of application No. 15/970,600, filed on May 3, 2018, now Pat. No. Re. 48,865, which is an application for the reissue of Pat. No. 9,328,450.

(30) Foreign Application Priority Data

Oct. 28, 2010 (KR) ..... 10-2010-0105693

(51) Int. Cl.
*D06F 39/02* (2006.01)
*D06F 29/00* (2006.01)
(Continued)

(52) U.S. Cl.
CPC ..... *D06F 39/02* (2013.01); *D06F 29/00* (2013.01); *D06F 39/088* (2013.01); *D06F 39/12* (2013.01)

(58) Field of Classification Search
CPC ..... D06F 39/022; D06F 39/12; D06F 39/02; D06F 39/125; D06F 29/00; D06F 39/088
See application file for complete search history.

(56) References Cited

U.S. PATENT DOCUMENTS

2005/0132504 A1 6/2005 Yang et al.
2008/0041118 A1* 2/2008 Wong et al. ..... 68/5 R
(Continued)

FOREIGN PATENT DOCUMENTS

CN 03/057970 A1 7/2003
CN 1536133 10/2004
(Continued)

OTHER PUBLICATIONS

Korean Patent Abstract, Publication No. 10-2009-0024905.
Office Action (Restriction Requirement) issued Mar. 24, 2015 in corresponding U.S. Appl. No. 13/137,864 (8 pages).
Non-final Office Action issued Jul. 30, 2015 in corresponding U.S. Appl. No. 13/137,864 (17 pages).
(Continued)

*Primary Examiner* — Terrence R Till
(74) *Attorney, Agent, or Firm* — STAAS & HALSEY LLP

(57) ABSTRACT

A washing machine in which a detergent case is located below a washing tub unit and detergent and wash water are supplied from the detergent case to the washing tub unit by a pump. An overflow hole to prevent overflow of water to the outside the detergent case is provided on the detergent case, and the detergent and the wash water do not overflow the detergent case and are discharged to an outside of the washing machine through the overflow hole when the pump breaks down.

7 Claims, 5 Drawing Sheets

(51) Int. Cl.

| | |
|---|---|
| ***D06F 39/08*** | (2006.01) |
| ***D06F 39/12*** | (2006.01) |

(56) References Cited

U.S. PATENT DOCUMENTS

| | | | | |
|---|---|---|---|---|
| 2008/0229790 | A1 | 9/2008 | Kim | |
| 2009/0288452 | A1* | 11/2009 | Lee et al. | D06F 39/022 68/12.18 |
| 2010/0107704 | A1* | 5/2010 | Seo | D06F 39/088 68/17 R |
| 2010/0275386 | A1* | 11/2010 | Ko | D06F 29/00 8/158 |
| 2011/0154865 | A1* | 6/2011 | Lee | D06F 39/02 68/17 R |
| 2011/0174021 | A1 | 7/2011 | Lee | |
| 2011/0241501 | A1* | 10/2011 | Heo | D06F 29/005 312/107 |
| 2011/0277515 | A1 | 11/2011 | Doh | |

FOREIGN PATENT DOCUMENTS

| | | | |
|---|---|---|---|
| CN | 1869317 | | 11/2006 |
| CN | 101775729 | | 7/2010 |
| JP | 6-71087 | | 3/1994 |
| JP | 7-68082 | | 3/1995 |
| JP | 7068081 | | 3/1995 |
| JP | 2009-056264 | | 3/2009 |
| KR | 10-2009-0024905 | | 3/1995 |
| KR | 10-0166887 | | 4/1999 |
| KR | 10-2008-0065753 | | 7/2008 |
| KR | 10-2008-0089087 | | 10/2008 |
| KR | 10-2009-0024905 | | 3/2009 |
| KR | 10-2010-0081207 | | 7/2010 |
| WO | 03/057970 | A1 | 7/2003 |

OTHER PUBLICATIONS

Notice of Allowance issued Feb. 10, 2016 in corresponding U.S. Appl. No. 13/137,864 (9 pages).

Notice of Preliminary Rejection dated Jan. 5, 2017 in corresponding Korean Patent Application No. 10-2010-0105693 (Total of 19 pages).

Notice of Preliminary Rejection dated Jul. 24, 2017 in corresponding Korean Patent Application No. 10-2010-0105693 (Total of 14 pages).

Notice of Preliminary Rejection dated Jan. 26, 2018 in corresponding Korean Patent Application No. 10-2010-0105693 (Total of 5 pages).

Office Action dated Oct. 18, 2019 in U.S. Appl. No. 15/970,600.

Final Office Action dated Mar. 9, 2020 in U.S. Appl. No. 15/970,600.

Final Office Action dated Sep. 30, 2020 in U.S. Appl. No. 15/970,600.

Advisory Action dated Dec. 14, 2020 in U.S. Appl. No. 15/970,600.

Office Action dated Mar. 26, 2021 in U.S. Appl. No. 15/970,600.

Notice of Allowance dated Aug. 17, 2021 in U.S. Appl. No. 15/970,600.

U.S. Appl. No. 15/970,600, filed May 3, 2018, now U.S. Pat. No. Re. 48,865, Yong Sok Lee, Samsung Electronics Co., Ltd.

U.S. Appl. No. 13/137,864, filed Sep. 19, 2011, now U.S. Pat. No. 9,328,450, Yong Sok Lee, Samsung Electronics Co., Ltd.

Korean Patent Abstract, Publication No. 10-2009-0024905, Published Mar. 10, 2009.

Abstract of Publication No. 7068081, Published Mar. 14, 1995.

Chinese Office Action issued Feb. 4, 2015 in corresponding Chinese Patent Application No. 201110320069.9.

Espacenet English Abstract of Chinese Patent Publication No. 1536133, Published Oct. 13, 2014.

Espacenet English Abstract of Chinese Patent Publication No. 101775729, Published Jul. 14, 2010.

Espacenet English Abstract of Chinese Patent Publication No. 1869317, Published Nov. 29, 2006.

* cited by examiner

WASHING MACHINE AND DETERGENT CASE THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a broadening continuation reissue application of U.S. Patent Reissue application Ser. No. 15/970,600, filed with the U.S. Patent and Trademark Office on May 3, 2018, which is a broadening reissue application of U.S. patent application Ser. No. 13/137,864, filed with the U.S. Patent and Trademark Office on Sep. 19, 2011 and issued as U.S. Pat. No. 9,328,450 on May, 3, 2016, and* claims the benefit of Korean Patent Application No. *10*-2010-0105693, filed on Oct. 28, 2010 in the Korean Intellectual Property Office, the disclosure of which is incorporated herein by reference.

BACKGROUND

1. Field

Embodiments of the present invention relate to a washing machine having a structure to prevent water from overflowing a detergent case.

2. Description of the Related Art

For the sake of user convenience, a washing machine may be installed on a rack. Further, a washing machine provided with two washing tub units, so that a user may simultaneously wash two groups of laundry separated from each other, has been developed.

If a washing machine is installed at a designated height from the ground in such a manner, a detergent case may be installed at the lower portion of the washing machine, i.e., at a region below a washing tub unit so as to allow a user to easily put detergents into the detergent case. In the case, the detergents and wash water need to be supplied from the detergent case to the washing tub unit by a separate pump provided.

In such a washing machine, if the pump breaks down, the detergents and the wash water are not transferred from the detergent case to the washing tub unit, instead overflowing the detergent case.

If the washing machine is installed at a high position, as described above, the detergent case may be located at a position higher than the level of the user's eyes. In this case, it is difficult for a user to observe amounts of the detergents put into the detergent case.

SUMMARY

Therefore, it is an aspect of the present invention to provide a washing machine, which prevents wash water from overflowing a detergent case even if a pump to pump the wash water breaks down, and a detergent case thereof.

It is another aspect of the present invention to provide a washing machine, which allows a user to easily observe amounts of detergents put into a detergent case if the detergent case is located at a position higher than the level of the user's eyes, and a detergent case thereof.

Additional aspects of the invention will be set forth in part in the description which follows and, in part, will be obvious from the description, or may be learned by practice of the invention.

In accordance with one aspect of the present invention, a washing machine includes a cabinet forming the external appearance of the washing machine, a stationary tub fixed to the inside of the cabinet so as to receive water, a rotary drum rotatably installed within the stationary tub so as to wash laundry, a detergent case installed at the lower portion of the cabinet, a pump to pump water from the detergent case into the stationary tub, and an overflow hole provided on the detergent case so as to prevent overflow of water to the outside of the detergent case.

The detergent case may include a housing fixed to the cabinet and a drawer provided with a receptacle or parts to receive detergent(s) and mounted in the housing so as to be drawn into and out of the housing, and the overflow hole may be formed on the housing.

The housing may include an outflow hole communicating with the pump, and the overflow hole may be formed at a position higher than the outflow hole.

The housing may be provided with an opened front surface so that the drawer is drawn into and out of the housing through the opened front surface, and the overflow hole may be formed at a position lower than the opened front surface of the housing.

The overflow hole may be formed on a bottom surface or a side surface of the housing.

The washing machine may further include an overflow passage communicating the overflow hole with the outside of the cabinet.

The washing machine may further include a drain passage provided to discharge water from the stationary tub to the outside of the cabinet, and the overflow passage may be joined to the drain passage.

The pump may be formed integrally with the housing.

The drawer may be formed of a transparent material.

In accordance with another aspect of the present invention, a washing machine includes a cabinet forming the external appearance of the washing machine, a stationary tub fixed to the inside of the cabinet so as to receive water, a rotary drum rotatably installed within the stationary tub so as to wash laundry, a detergent case installed above the stationary tub, and an overflow hole provided on the detergent case so as to prevent overflow of water to the outside of the detergent case.

The detergent case may include a housing fixed to the cabinet and a drawer provided with detergent receiving parts to receive detergents and mounted in the housing so as to be drawn into and out of the housing, and the overflow hole may be formed on the housing.

The housing may include an outflow hole communicating with the pump, and the overflow hole may be formed at a position higher than the outflow hole.

The housing may be provided with an opened front surface so that the drawer is drawn into and out of the housing through the opened front surface, and the overflow hole may be formed at a position lower than the opened front surface of the housing.

The overflow hole may be formed on a bottom surface or a side surface of the housing.

The washing machine may further include an overflow passage communicating the overflow hole with the outside of the cabinet.

The washing machine may further include a drain passage provided to discharge water from the stationary tub to the outside of the cabinet, and the overflow passage may be joined to the drain passage.

The drawer may be formed of a transparent material.

In accordance with a further aspect of the present invention, a detergent case of a washing machine, into which detergents are put so that the detergents together with water are supplied to a stationary tub of the washing machine, includes a drawer provided with detergent receiving parts to receive the detergents, and a housing, in which the drawer is mounted so as to be drawn into and out of the housing, wherein the housing includes an outflow hole communicating with the stationary tub and an overflow hole to prevent overflow of water to the outside of the detergent case, and the overflow hole is formed at a position higher than the outflow hole.

The housing may be provided with an opened front surface so that the drawer is drawn into and out of the housing through the opened front surface, and the overflow hole may be formed at a position lower than the opened front surface of the housing.

The overflow hole may be formed on a bottom surface or a side surface of the housing.

The housing may be formed integrally with a pump to pump water discharged through the outflow hole into the stationary tub.

The drawer may be formed of a transparent material.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
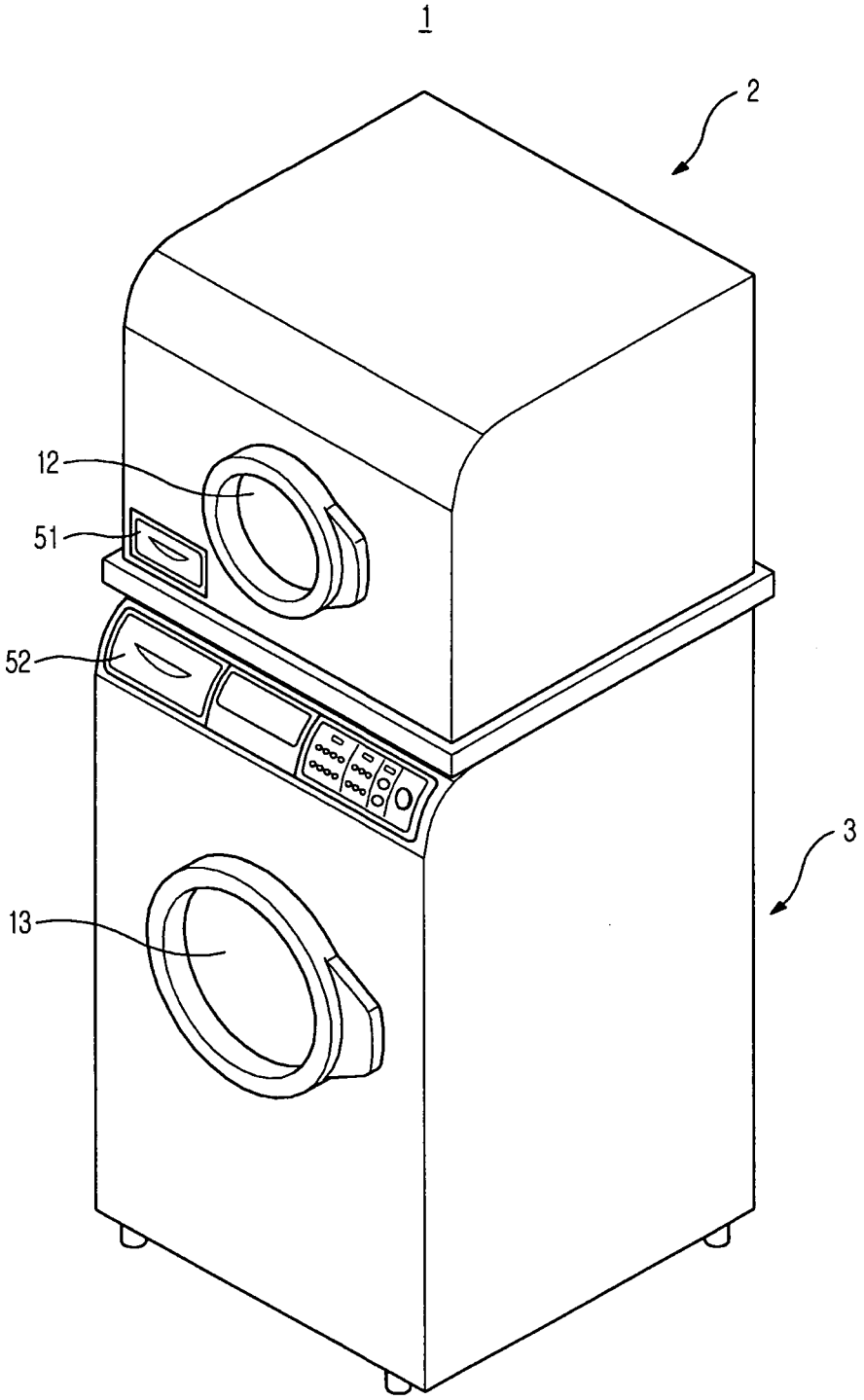
FIG. 1 is an exploded view of a twin-type washing machine to which a washing machine in accordance with one embodiment of the present invention is applied.

Reference will now be made in detail to the embodiments of the present invention, examples of which are illustrated in the accompanying drawings, wherein like reference numerals refer to like elements throughout.

FIG. 1 is an exploded view of a twin-type washing machine to which a washing machine in accordance with embodiments of the present invention can be applied.

A twin-type washing machine 1 shown in FIG. 1 is formed by vertically stacking two individual washing machines 2 and 3. A user classifies laundry according to colors and materials thereof, and puts classified groups of the laundry into the upper washing machine 2 and the lower washing machine 3, respectively, so that the classified groups of the laundry may be washed simultaneously.

Here, in the case of the lower washing machine 3, a detergent case 52 is disposed at a position higher than a washing tub unit (not shown) in the same manner as the general washing machine, and thus detergents put into the detergent case 52 flow, together with wash water, to the washing tub unit (not shown) due to gravity.

However, in the case of the upper washing machine 2, a detergent case 51 is disposed at the lower portion of the washing machine 2 so that a user may easily put detergents into the detergent case 51. Here, since the detergent case 51 is located at a position lower than a washing tub unit 15 (with reference to FIG. 2), a pump 81 (with reference to FIG. 2) to supply the detergents and wash water to the washing tub unit 15 is installed.

The upper washing machine 2 in accordance with this embodiment of the present invention is configured such that the detergent case 51 is located at the position lower than the washing tub unit 15, the pump 81 to supply the detergents and the wash water to the washing tub unit 15 is installed, and a structure to prevent water from overflowing the detergent case 51 when the pump 81 breaks down is provided.

A detailed configuration of the washing machine 2 will be described as follows. In FIG. 1, doors 12, 13, respectively, of the upper washing machine 2 and the lower washing machine 3, are provided.

Figure 2:
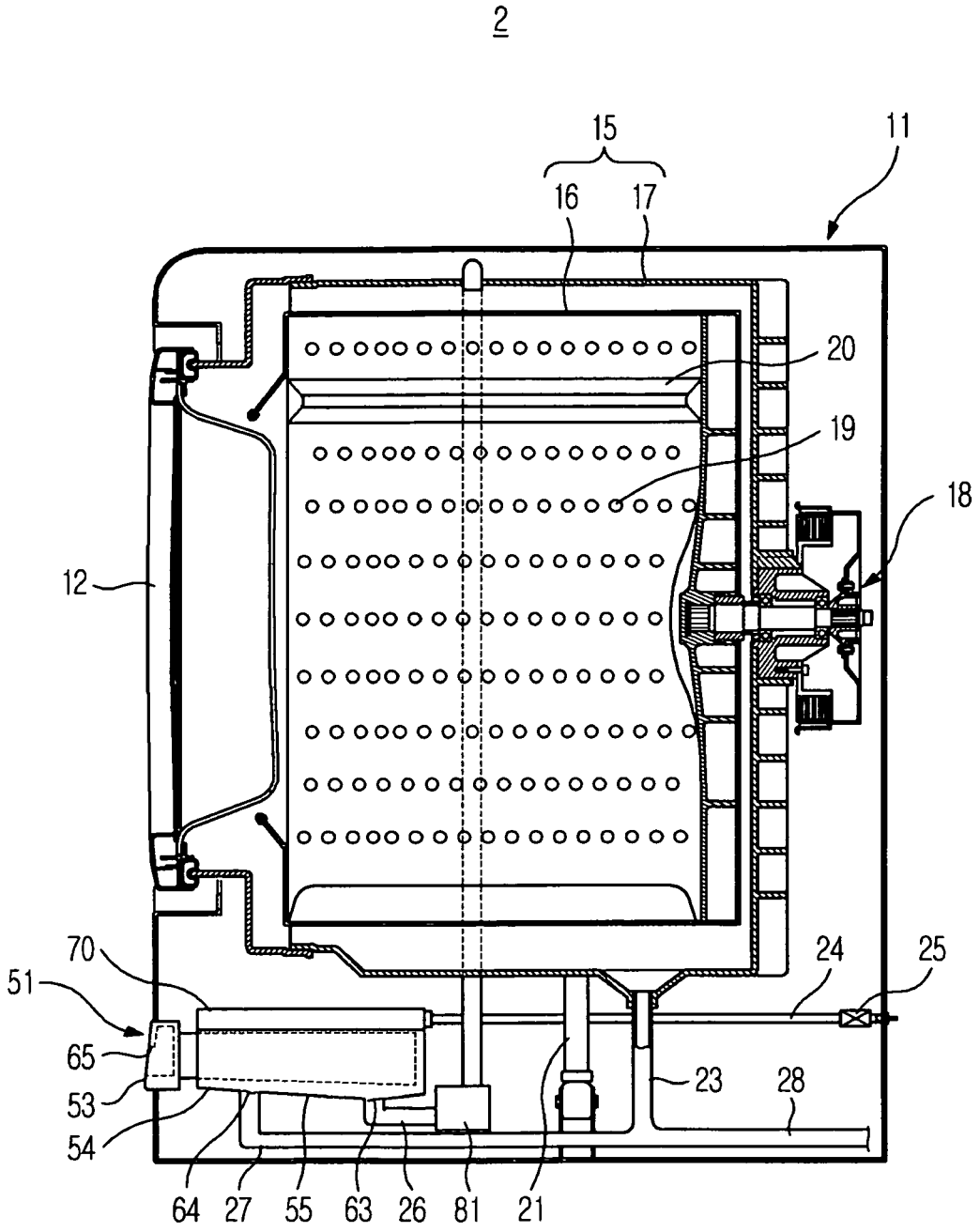
FIG. 2 is a longitudinal-sectional view illustrating the inside of a washing machine in accordance with an embodiment of the present invention.
Figure 3:
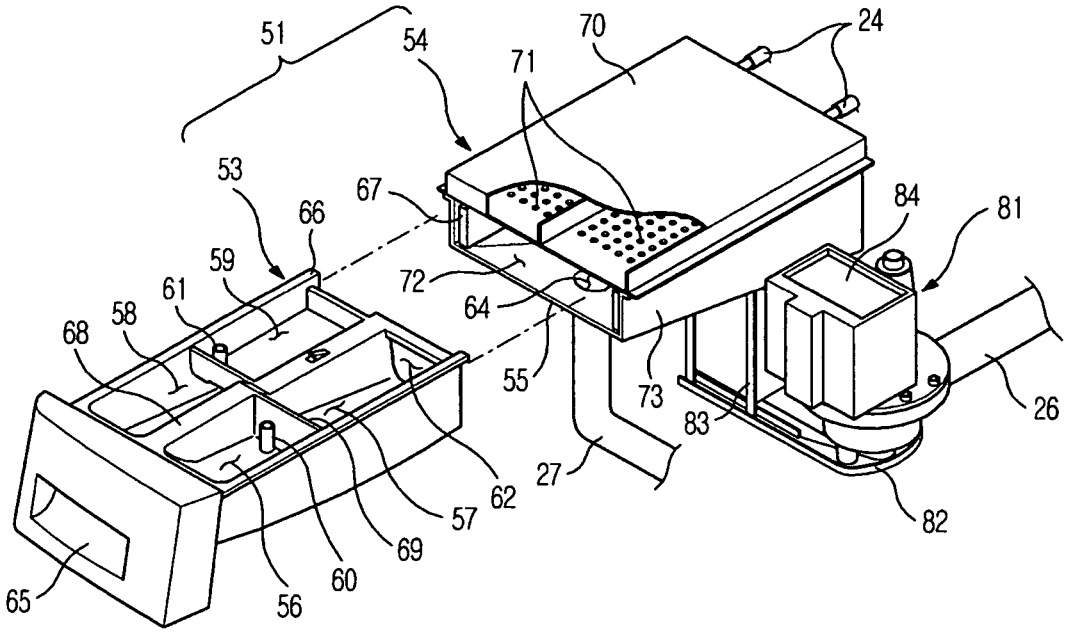
FIG. 3 is a perspective view illustrating a detergent case of the washing machine in accordance with an embodiment of the present invention.
Figure 4:
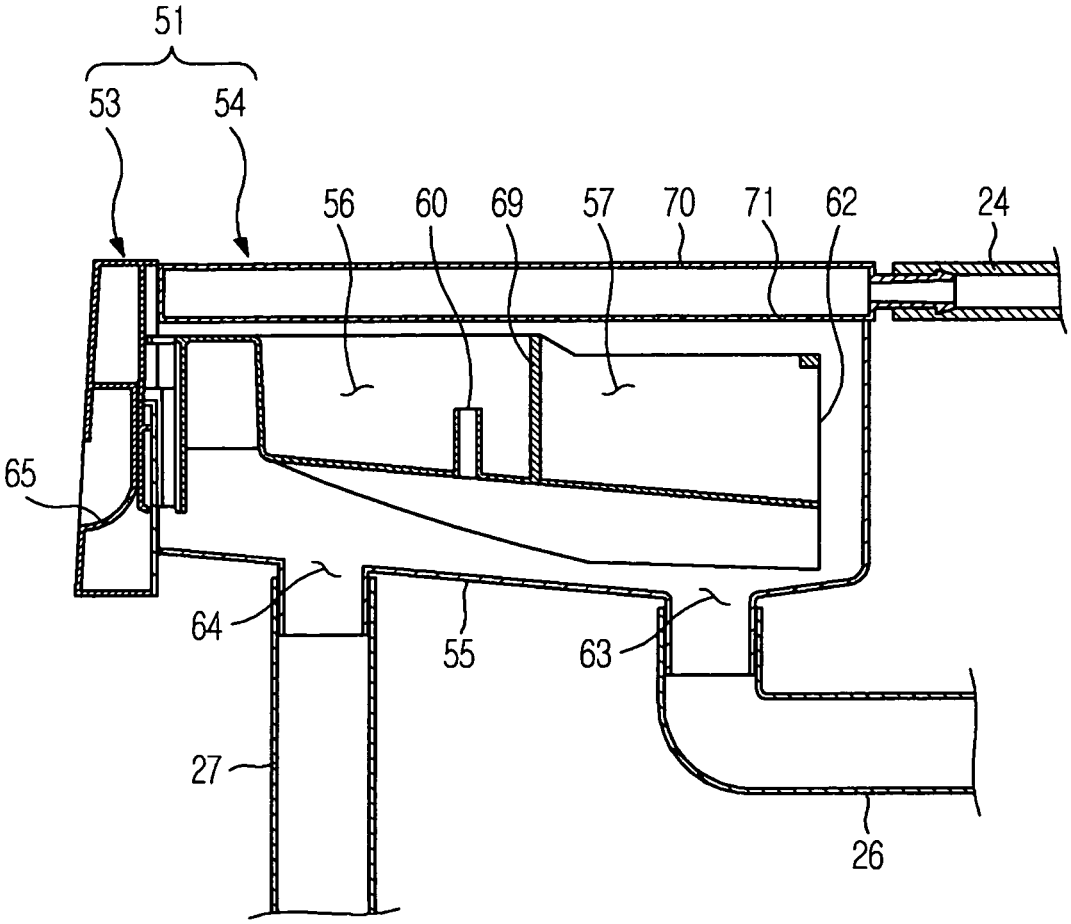
FIG. 4 is a longitudinal-sectional view illustrating the detergent case of the washing machine in accordance with an embodiment of the present invention.
Figure 5:
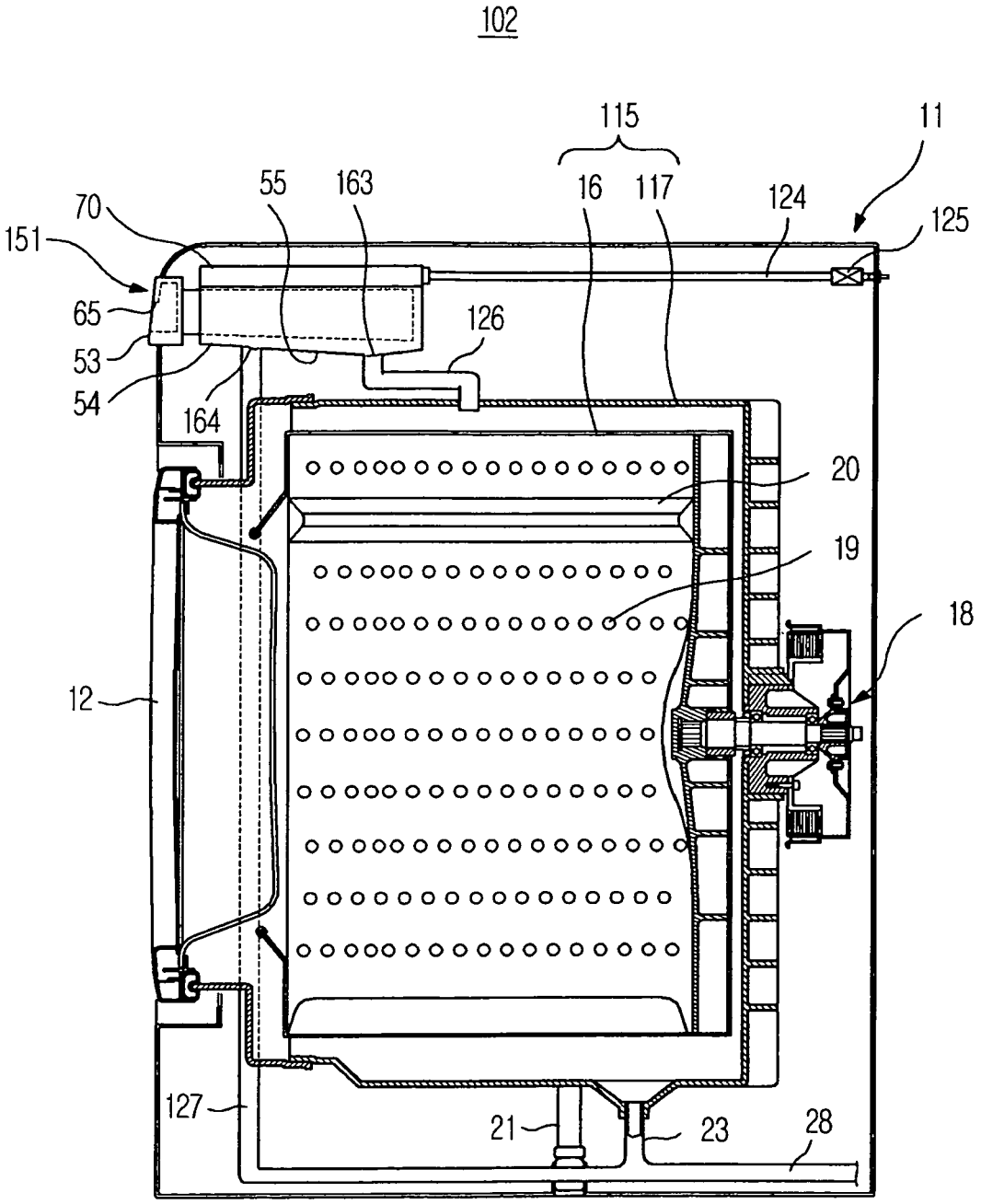
FIG. 5 is a longitudinal-sectional view illustrating the inside of a washing machine in accordance with another embodiment of the present invention.

FIG. 2 is a longitudinal-sectional view illustrating the inside of the upper washing machine 2 in accordance with an embodiment of the present invention, FIGS. 3 and 4 are perspective and longitudinal-sectional views illustrating the detergent case of the washing machine in accordance with an embodiment of the present invention, and FIG. 5 is a longitudinal-sectional view illustrating the inside of a washing machine in accordance with another embodiment of the present invention.

With reference to FIGS. 2 to 4, the washing machine 2 includes a cabinet 11, the washing tub unit 15, the detergent case 51, the pump 81 and an overflow hole 64.

The cabinet 11 forms the external appearance of the washing machine 2 and houses the washing tub unit 15, the detergent case 51 and water supply devices 24 and 25.

The washing tub unit 15 includes a stationary tub 17 and a rotary drum 16. The stationary tub 17 receives water and is fixed to the cabinet 11 by a damper 21.

The drum 16 is rotatably installed in the stationary tub 17, and the door 12 is opened to allow laundry to be put into the drum 16. The drum 16 is rotated by power transmitted from a motor 18. Lifters 20 to tumble the laundry are provided on the inner circumferential surface of the drum 16, and through holes 19 through which the water in the stationary tub 17 passes are formed on the circumferential surface of the drum 16.

The detergent case 51 is provided at the lower portion of the cabinet 11. The detergent case 51 is configured such that when a user put detergent(s) into the detergent case 51, the detergents and wash water supplied from an external water supply source are mixed and are then supplied to the washing tub unit 15. The detergent case 51 includes a housing 54 fixed to the cabinet 11, and a drawer 53 mounted in the housing 54 so as to be drawn into and out of the housing 54. The drawer 53 is drawn into and out of the housing 54 through an opened front surface 72 of the housing 54.

The drawer 53 may have various configurations. For example, a handle 65 allowing the user to draw the drawer 53 into and out of the housing 54 may be provided on the drawer 53, and detergent receiving parts 56, 57, 58 and 59 to receive detergents may be formed on the drawer 53. In the drawings, four detergent receiving parts 56, 57, 58 and 59 are divided from each other by diaphragms 68 and 69. Liquid detergent receiving parts 56 and 59 receive liquid detergents and are provided with siphon protrusions 60 and 61 allowing the liquid detergents to enter the housing 54 through a siphon action. Although not shown in the drawings, the liquid detergent receiving parts 56 and 59 are coated with covers (not shown) provided with siphon caps (not shown) so as to form siphon passages together with the siphon protrusions 60 and 61.

Powder detergent receiving parts 57 and 58 receive powder detergents and are provided with inclined bottom surfaces and discharge holes 62 formed on the lower end of the inclined bottom surfaces so as to allow the powder detergents to be mixed with water and then to flow toward the housing 54. Guide protrusions 66 corresponding to guide parts 67 formed on the inner surface of the housing 54 are formed on the outer surface of the upper portion of the drawer 53 so that the drawer 53 slides into and out of the housing 54.

If the drawer 53 is located at a position higher than eye level, it is difficult for a user to observe amounts of the detergents put into the detergent receiving parts 56, 57, 58 and 59. Therefore, the drawer 53 may be made of a transparent material so that the user may observe the amounts of the detergents put into the detergent receiving parts 56, 57, 58 and 59 even when looking at the drawer 53 from the bottom.

The housing 54 is fixed to the cabinet 11, and is formed in an approximately rectangular parallelepiped shape provided with the opened front surface 72 so as to house the drawer 53.

The housing 54 includes a water supply case 70 provided with multiple water supply holes 71 so that water supplied from the external water supply source is supplied to the detergent receiving parts 56, 57, 58 and 59. The water supply devices 24 and 25 include water supply hoses 24 and water supply valves 25, and the water supply valves 25 provided on the water supply hoses 24 control water supply to the water supply case 70.

The detergents put into the detergent receiving parts 56, 57, 58 and 59 of the drawer 53 together with water are introduced into the housing 54 through the siphon protrusions 60 and 61 or the discharge holes 62.

An outflow hole 63 is provided on a bottom surface 55 of the housing 54 so as to supply water to the stationary tub 17, and the overflow hole 64 to prevent the water in the housing 54 from overflowing is provided at a position higher than the outflow hole 63. Therefore, water introduced into the housing 54 generally flows toward the pump 81 through the outflow hole 63 but does not pass through the overflow hole 64. However, if the pump 81 malfunctions and does not pump water into the stationary tub 17, when the water reaches the height of the overflow hole 64, the water flows toward an overflow passage 27 through the overflow hole 64.

Here, the overflow passage 27 is installed in the cabinet 11, and communicates the overflow hole 64 with the outside of the cabinet 11, thereby allowing water having passed through the overflow hole 64 to be safely discharged to the outside of the cabinet 11.

Although the drawings illustrate the outflow hole 63 and the overflow hole 64 as being formed on the bottom surface 55 of the housing 54, the positions of the outflow hole 63 and the overflow hole 64 are not limited thereto but the outflow hole 63 and the overflow hole 64 may be formed on a side surface 73 of the housing 54, as long as the overflow hole 64 is located at a position which is higher than the outflow hole 63 and is lower than the opened front surface 72 of the housing 54.

Through the above configuration, if the pump 81 to transfer water from the detergent case 51 to the stationary tub 17 breaks down or malfunctions, although such a problem is not recognized and water supply to the detergent case 51 continues to be carried out, when the water in the detergent case 51 reaches the height of the overflow hole 64, the water is safely discharged to the outside of the cabinet 11 through the overflow hole 64 and thus does not overflow the detergent case 51.

The outflow hole 63 communicates with the inside of the stationary tub 17 through a supply hose 26. The pump 81 to transfer the water in the detergent case 51 to the stationary tub 17 located at a position higher than the detergent case 51 is installed on the supply hose 26. The pump 81 performs a pumping action using power transmitted from a pump motor 84, and transfers water containing detergents from the detergent case 51 to the stationary tub 17 using the pumping action.

Here, a plurality of fixing bars 83 is vertically installed on the outer side of the bottom surface of the housing 54, and the pump 81 and the detergent case 51 are integrated with each other by inserting brackets 82 to fix the pump 81 into spaces between the fixing bars 83.

As described above, the overflow hole 64 communicates with the outside of the cabinet 11 through the overflow passage 27. The overflow passage 27 may be a hose communicating the overflow hole 64 with the outside of the cabinet 11.

Further, as shown in FIG. 2, the overflow passage 27 is joined to a drain passage 23 to discharge water from the stationary tub 17, thereby allowing the water in the detergent case 51 to be discharged to the outside through a drain passage 28

As described above, the washing machine in accordance with this embodiment is configured such that the detergent case 51 is located at a position lower than the washing tub unit 15, the pump 81 to transfer water from the detergent case 51 to the washing tub unit 15 is installed, and the overflow hole 64 and the overflow passage 27 to cope with the breakdown of the pump 81 is provided.

However, in accordance with another embodiment of the present invention shown in FIG. 5, an overflow hole 164 and an overflow passage 127 may be applied to a general washing machine 102 in which a detergent case 151 is located at a position higher than a washing tub unit 115 and water is introduced from the detergent case 151 to the washing tub unit 115 due to gravity.

This embodiment is the same as the former embodiment shown in FIGS. 1 to 4 except that the detergent case 151 and a water supply device 124 and 125 are located above the washing tub unit 115 and no pump is provided.

An outflow hole 163 connected to a supply hose 126 so as to allow water to flow to a stationary tub 117 is provided on the detergent case 151, and the overflow hole 164 is provided at a position higher than the outflow hole 163.

Therefore, if a large amount of water is momentarily supplied to the detergent case 151 or the supply hose 126 connecting the detergent case 151 to the washing tub unit 115 is clogged, water does not overflow the detergent case 151 and may be safely discharged to the outside through the overflow hole 164.

As is apparent from the above description, a washing machine in accordance with one embodiment of the present invention prevents wash water from overflowing a detergent case and safely discharges the wash water to the outside of the washing machine even if a pump to pump the wash water into a washing tub unit breaks down.

Further, the washing machine allows a user to easily observe amounts of detergents put into the detergent case even if the detergent case is located at a position higher than the level of the user's eyes.

Although various embodiments of the present invention have been shown and described, it would be appreciated by those skilled in the art that changes may be made in these embodiments without departing from the principles and spirit of the invention, the scope of which is defined in the claims and their equivalents.

What is claimed is:

[1. A washing machine comprising:
a cabinet;
a stationary tub in the cabinet;
a rotary drum in the stationary tub;
a detergent case in the cabinet below the stationary tub to receive water and detergent;
a pump to pump the water and the detergent from the detergent case into the stationary tub;
an overflow hole provided on the detergent case and directly connected to a drain so as to prevent overflow of the water to an outside of the detergent case; and
an outflow hole communicating with the pump,
wherein the overflow hole is formed at a position higher than the outflow hole.]

[2. The washing machine according to claim 1, wherein:
the detergent case includes a housing fixed to the cabinet, and a drawer provided with a receptacle to receive the detergent and mounted in the housing so as to be drawn into and out of the housing; and
the overflow hole is formed on the housing.]

[3. The washing machine according to claim 2, wherein:
the housing is provided with an opened front surface so that the drawer can be drawn into and out of the housing through the opened front surface; and
the overflow hole is formed at a position lower than the opened front surface of the housing.]

[4. The washing machine according to claim 2, wherein the overflow hole is formed on a bottom surface of the housing.]

[5. The washing machine according to claim 1, further comprising an overflow passage communicating the overflow hole with the outside of the cabinet.]

[6. The washing machine according to claim 5, further comprising a drain passage provided to discharge water from the stationary tub to the outside of the cabinet,
wherein the overflow passage is joined to the drain passage.]

[7. The washing machine according to claim 2, wherein the pump is formed integrally with the housing.]

[8. The washing machine according to claim 2, wherein the drawer is formed of a transparent material.]

[9. The washing machine according to claim 2, wherein the overflow hole is formed in a side surface of the housing.]

[10. The washing machine according to claim 2, wherein the receptacle is a plurality of receptacles.]

[11. A washing machine comprising:
a cabinet;
a stationary tub in the cabinet;
a rotary drum in the stationary tub;
a detergent case in the cabinet below the stationary tub to receive water and detergent,
wherein the detergent case includes a housing fixed to the cabinet, and a drawer provided with a receptacle to receive the detergent and mounted in the housing so as to be drawn into and out of the housing;
a pump to pump the water and the detergent from the detergent case into the stationary tub; and
an overflow hole provided on the detergent case so as to prevent overflow of the water to an outside of the detergent case,
an outflow hole communicating with the housing,
wherein the overflow hole is formed at a position higher on the housing than the outflow hole;
an overflow passage communicating the overflow hole with the outside of the cabinet; and
a drain passage provided to discharge water from the stationary tub to the outside of the cabinet,
wherein the overflow passage is joined to the drain passage.]

*12. A stackable clothes treatment system comprising:*
*a first clothes treatment apparatus including:*
*a first cabinet;*
*a first drum rotatably installed in the first cabinet;*
*a first detergent case in the first cabinet, and configured to receive water and detergent;*
*a second clothes treatment apparatus disposed above the first clothes treatment apparatus, and stackable with the first clothes treatment apparatus, the second clothes treatment apparatus including:*
*a second cabinet; and*
*a second drum rotatably installed in the second cabinet; and*
*a control panel disposed between the first drum and the second drum, and configured to control the first clothes treatment apparatus and the second clothes treatment apparatus,*
*wherein:*
*the second clothes treatment apparatus further includes:*
*a second detergent case in the second cabinet, and disposed below the second drum to receive water and detergent;*
*a pump to pump the water and detergent from the second detergent case into the second drum;*
*an overflow hole provided on the second detergent case, and directly connected to a drain so as to prevent the water from overflowing in the second detergent case by discharging the overflown water to an outside of the second detergent case therethrough; and*
*an outflow hole communicating with the pump; and*
*the overflow hole is formed at a position higher than the outflow hole.*

*13. The stackable clothes treatment system according to claim 12, wherein the control panel disposed on a front surface of the first cabinet.*

*14. The stackable clothes treatment system according to claim 12, wherein:*
*the second detergent case includes:*
*a housing fixed to the second cabinet; and*

*a drawer provided with a receptacle to receive the detergent, and mounted in the housing so as to be drawn into or out of the housing; and*

*the overflow hole is formed on the housing.*

*15. The stackable clothes treatment system according claim 14, wherein the drawer is formed of a transparent material.*

*16. The stackable clothes treatment system according to claim 14, wherein: the housing is provided with an opened front surface so that the drawer can be drawn into and out of the housing through the opened front surface; and*

*the overflow hole is formed at a position lower than the opened front surface of the housing.*

*17. The stackable clothes treatment system according to claim 14, wherein the overflow hole is formed on a bottom surface of the housing.*

*18. The stackable clothes treatment system according to claim 12, further comprising an overflow passage communicating the overflow hole with the outside of the second detergent case.*

* * * * *